(12) United States Patent
Kato

(10) Patent No.: US 10,733,355 B2
(45) Date of Patent: Aug. 4, 2020

(54) INFORMATION PROCESSING SYSTEM THAT STORES METRICS INFORMATION WITH EDITED FORM INFORMATION, AND RELATED CONTROL METHOD INFORMATION PROCESSING APPARATUS, AND STORAGE MEDIUM

(71) Applicant: CANON KABUSHIKI KAISHA, Tokyo (JP)

(72) Inventor: Yutaka Kato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/359,029

(22) Filed: Nov. 22, 2016

(65) Prior Publication Data

US 2017/0154023 A1   Jun. 1, 2017

(30) Foreign Application Priority Data

Nov. 30, 2015   (JP) .................................. 2015-233156

(51) Int. Cl.
*G06F 40/109* (2020.01)
*G06F 40/174* (2020.01)
*G06F 40/106* (2020.01)

(52) U.S. Cl.
CPC .......... *G06F 40/109* (2020.01); *G06F 40/106* (2020.01); *G06F 40/174* (2020.01)

(58) Field of Classification Search
None
See application file for complete search history.

(56) References Cited

U.S. PATENT DOCUMENTS

| 5,289,169 | A | * | 2/1994 | Corfield | G06F 17/214 345/469.1 |
| 5,893,915 | A | * | 4/1999 | Cordell | G06F 17/214 715/262 |
| 6,490,051 | B1 | * | 12/2002 | Nguyen | G06F 3/1206 358/1.11 |
| 6,546,397 | B1 | * | 4/2003 | Rempell | G06F 8/20 |
| 7,046,848 | B1 | * | 5/2006 | Olcott | G06K 9/00442 382/176 |
| 7,064,758 | B2 | * | 6/2006 | Chik | G06F 17/2229 345/467 |
| 7,492,365 | B2 | * | 2/2009 | Corbin | G06F 40/109 345/468 |
| 7,528,834 | B2 | * | 5/2009 | Chik | G06F 17/214 345/418 |

(Continued)

FOREIGN PATENT DOCUMENTS

| JP | 2001-255867 A | 9/2001 |
| JP | 2004164092 A | 6/2004 |
| JP | 2005092426 A | 4/2005 |

*Primary Examiner* — Scott T Baderman
*Assistant Examiner* — Benjamin Smith
(74) *Attorney, Agent, or Firm* — Venable LLP

(57) ABSTRACT

An information processing system obtains, from an OS, metrics information of a font included in form information of a business form when the form information of the business form is edited; and stores the metrics information together with the edited form information; and generates a business form page by calculating a layout configuration of the business form based on the metrics information that has been stored, and by performing overlay output of the form information and field data of the business form based on the calculated layout configuration.

6 Claims, 15 Drawing Sheets

(56) References Cited

U.S. PATENT DOCUMENTS

| | | | | |
|---|---|---|---|---|
| 7,580,038 B2* | 8/2009 | Chik | G06F 17/214 | 345/418 |
| 7,889,359 B2* | 2/2011 | Noda | G06F 40/126 | 358/1.11 |
| 7,937,658 B1* | 5/2011 | Lunde | G06F 17/214 | 715/256 |
| 7,996,759 B2* | 8/2011 | Elkady | G06F 40/177 | 715/225 |
| 8,370,733 B2 | 2/2013 | Kato | 715/217 | |
| 8,413,051 B2* | 4/2013 | Bacus | G06F 40/106 | 715/269 |
| 8,707,208 B2* | 4/2014 | DiCamillo | G06F 40/103 | 715/810 |
| 8,717,596 B2* | 5/2014 | Cogan | G06F 3/1225 | 358/1.15 |
| 9,741,142 B2* | 8/2017 | Dwivedi | G06K 9/6828 | |
| 2002/0159084 A1* | 10/2002 | Daniels | G06F 17/214 | 358/1.11 |
| 2003/0095135 A1* | 5/2003 | Kaasila | G06F 3/0481 | 345/613 |
| 2004/0061703 A1* | 4/2004 | Chik | G06F 17/2229 | 345/467 |
| 2004/0133855 A1* | 7/2004 | Blair | G06F 17/211 | 715/249 |
| 2004/0207627 A1* | 10/2004 | Konsella | G06F 21/608 | 345/471 |
| 2005/0275656 A1* | 12/2005 | Corbin | G06F 17/214 | 345/467 |
| 2006/0059418 A1* | 3/2006 | Elkady | G06F 17/245 | 715/269 |
| 2006/0072137 A1* | 4/2006 | Nishikawa | G06F 17/214 | 358/1.11 |
| 2007/0055934 A1* | 3/2007 | Adamson, III | G06F 17/214 | 715/234 |
| 2007/0159646 A1* | 7/2007 | Adelberg | G06F 17/214 | 358/1.11 |
| 2007/0195349 A1* | 8/2007 | Noda | G06F 17/212 | 358/1.11 |
| 2008/0189600 A1* | 8/2008 | Lau | G06F 17/227 | 715/235 |
| 2009/0003434 A1* | 1/2009 | Song | H04N 19/25 | 375/240.01 |
| 2009/0059310 A1* | 3/2009 | Henry | H04N 1/00212 | 358/403 |
| 2009/0119578 A1* | 5/2009 | Relyea | G06F 9/451 | 715/234 |
| 2010/0064176 A1* | 3/2010 | Negishi | G06F 3/121 | 714/37 |
| 2010/0064223 A1* | 3/2010 | Tilton | G06T 13/80 | 715/732 |
| 2010/0097662 A1* | 4/2010 | Churilla | H04N 1/00795 | 358/448 |
| 2010/0107062 A1* | 4/2010 | Bacus | G06F 17/212 | 715/269 |
| 2010/0118037 A1* | 5/2010 | Sheikh | G06T 11/001 | 345/473 |
| 2010/0199174 A1* | 8/2010 | Leonov | G06F 17/214 | 715/255 |
| 2010/0238176 A1* | 9/2010 | Guo | G06T 11/206 | 345/440 |
| 2010/0275161 A1* | 10/2010 | DiCamillo | G06F 17/211 | 715/810 |
| 2010/0322373 A1* | 12/2010 | Churilla | H04N 1/00127 | 378/4 |
| 2011/0075196 A1* | 3/2011 | Cogan | G06F 3/1204 | 358/1.15 |
| 2012/0079374 A1* | 3/2012 | Gaddis | G06F 16/9577 | 715/269 |
| 2013/0188875 A1* | 7/2013 | Sesum | G06F 17/211 | 382/198 |
| 2015/0074522 A1* | 3/2015 | Harned, III | G06F 17/214 | 715/269 |
| 2015/0100882 A1* | 4/2015 | Severenuk | G06F 17/214 | 715/269 |
| 2015/0227493 A1* | 8/2015 | Ishida | G06F 13/4221 | 715/273 |
| 2015/0332491 A1* | 11/2015 | Dwivedi | G06T 11/60 | 345/636 |
| 2016/0246763 A1* | 8/2016 | Higuchi | G06F 17/21 | |
| 2016/0259772 A1 | 9/2016 | Kato | 715/222 | |

* cited by examiner

FIG. 9

```
<Font name="Font A">                                     901
  <Regular>                                 903
            <tmHeight>3072</tmHeight>
            <tmAscent>2171</tmAscent>
            <tmDescent>901</tmDescent>
            <tmInternalLeading>1024</tmInternalLeading>
            <tmMaxCharWidth>4525</tmMaxCharWidth>          904
            <tmOverhang>0</tmOverhang>
            <tmLastChar>65518</tmLastChar>
            <tmItalic>0</tmItalic>
            <tmPitchAndFamily>63</tmPitchAndFamily>
            <tmCharSet>128</tmCharSet>
            <otmAscent>1798</otmAscent>
            <otmDescent>-250</otmDescent>
            <otmsStrikeoutSize>108</otmsStrikeoutSize>      905
            <otmsStrikeoutPosition>760</otmsStrikeoutPosition>
            <otmsUnderscorePosition>-205</otmsUnderscorePosition>
  </Regular>
  <Bold>
            <tmHeight>3072</tmHeight>
            <tmAscent>2171</tmAscent>
            <tmDescent>901</tmDescent>
            <tmInternalLeading>1024</tmInternalLeading>
            <tmMaxCharWidth>4964</tmMaxCharWidth>
            <tmOverhang>0</tmOverhang>
            <tmLastChar>65518</tmLastChar>
            <tmItalic>0</tmItalic>
            <tmPitchAndFamily>63</tmPitchAndFamily>
            <tmCharSet>128</tmCharSet>
            <otmAscent>1798</otmAscent>
            <otmDescent>-250</otmDescent>
            <otmsStrikeoutSize>184</otmsStrikeoutSize>
            <otmsStrikeoutPosition>722</otmsStrikeoutPosition>
            <otmsUnderscorePosition>-205</otmsUnderscorePosition>
  </Bold>
```

902 — \<Regular\>
906 — \<Bold\>

FIG. 10

```
907 ──<Italic>
            <tmHeight>300</tmHeight>
            :
            <otmAscent>176</otmAscent>
            <otmDescent>-24</otmDescent>
            <otmsStrikeoutSize>11</otmsStrikeoutSize>
            <otmsStrikeoutPosition>74</otmsStrikeoutPosition>
            <otmsUnderscorePosition>-20</otmsUnderscorePosition>
        </Italic>
908 ──<BoldItalic>
            <tmHeight>300</tmHeight>
            :
            <otmAscent>176</otmAscent>
            <otmDescent>-24</otmDescent>
            <otmsStrikeoutSize>18</otmsStrikeoutSize>
            <otmsStrikeoutPosition>71</otmsStrikeoutPosition>
            <otmsUnderscorePosition>-20</otmsUnderscorePosition>
        </BoldItalic>
</Font>          909
<Font name="Font B">
        <Regular>
            <tmHeight>256</tmHeight>
            <tmAscent>220</tmAscent>
            <tmDescent>36</tmDescent>
            <tmInternalLeading>0</tmInternalLeading>
            <tmMaxCharWidth>286</tmMaxCharWidth>
            <tmOverhang>0</tmOverhang>
            <tmLastChar>65518</tmLastChar>
            <tmItalic>0</tmItalic>
            <tmPitchAndFamily>62</tmPitchAndFamily>
            <tmCharSet>128</tmCharSet>
            <otmAscent>220</otmAscent>
            <otmDescent>-36</otmDescent>
            <otmsStrikeoutSize>13</otmsStrikeoutSize>
            <otmsStrikeoutPosition>66</otmsStrikeoutPosition>
            <otmsUnderscorePosition>-17</otmsUnderscorePosition>
        </Regular>
```

INFORMATION PROCESSING SYSTEM THAT STORES METRICS INFORMATION WITH EDITED FORM INFORMATION, AND RELATED CONTROL METHOD INFORMATION PROCESSING APPARATUS, AND STORAGE MEDIUM

BACKGROUND OF THE INVENTION

Field of the Invention

The present invention relates to an information processing system, a control method for the information processing system, an information processing apparatus, and a storage medium.

Description of the Related Art

In order to make business more efficient and to save resources through paperless operation, companies that replace the information on a paper medium with document data have been increasing. For example, business forms that are operated in the office are often replaced with the document data. In particular, because large amounts of pages of the business forms are output by a mission-critical system, the operation cost is enormous, and thus computerization of the business form is being actively carried out. Additionally, a method that produces business form document data, including PDF format (a business form image), by performing overlay processing of the field data to form information to be a model of the business form (supply the field data to a form and apply it) has been proposed.

The business form document data is configured by, for example, a character string, a ruled line of a table, and an image such as a logo. The character string included in the business form document data is output by calculating the position for disposition by a business form generation program and drawing it. Various attributes can be specified in the character string to be output when a form is produced and edited by a form editing application. For example, it is possible to specify attributes including a font name, a font style, a font color, and an aligning position for drawing the character string.

The business form generation program uses the information about the specified font when calculating the character position. A variety of information is used depending on the business form generation program, and for example, it includes information that represents a position when a strike-through line or an underline is drawn and the maximum width of each character recorded in the font. For example, the maximum width of the characters is used by the business form generation program for calculating intervals of each line when a plurality of lines of vertical writing characters is present.

The font is a mechanism for representing a character string on a computer. There are various methods that realize a font depending on the OS (operating system). For example, in Windows (Registered Trademark), there is a font referred to as "TrueType" font. For representing a character on a computer, "TrueType" font includes data representing the outline of a character referred to as "glyph".

The glyph data is needed for each character, for example, the glyph of the character "A" and the glyph of the character "I" are each held in the inside of the font, which serve as different data. Additionally, the font has "metrics information" to serve as information common to the whole font. The information about a position when a strike-through line or an underline is drawn and the maximum width of a character is metrics information. The metrics information represents attributes as a font.

Conventionally, the form generation program has obtained the metrics information to be used when calculating the character position from the font installed in the OS. Japanese Patent Application Laid-Open Publication No. 2001-255867, discloses a character string drawing device that stores font data, and a plurality of font processing functions that handles a process associated with the use of the font data.

However, there are cases in which the metrics information is changed when the font is updated in accordance with the update of the OS. Even in the same font, the change of the metrics information affects the character-position calculation. That is, when the OS is updated and the metrics information is changed, the character is drawn at a position that is different from the conventional character position. In Japanese Patent Application Laid-Open Publication No. 2001-255867, no consideration is given to the case in which the metrics information is changed.

SUMMARY OF THE INVENTION

The present invention provides an information processing system that can maintain a layout at the time of the form editing of a business form even if the metrics information of the font included in an OS has been changed.

According to an aspect of the present invention, an information processing system includes an obtaining unit configured to obtain, from an OS, metrics information of a font included in form information of a business form when the form information of the business form is edited; a storage unit configured to store the metrics information together with the edited form information; and a generation unit configured to generate a business form page by calculating a layout configuration of the business form based on the metrics information that has been stored, and by performing overlay output of the form information and field data of the business form based on the calculated layout configuration.

Further features of the present invention will become apparent from the following description of exemplary embodiments (with reference to the attached drawings).

BRIEF DESCRIPTION OF THE DRAWINGS

FIG. 9 illustrates an example of an embedded metrics information list.

FIG. 10 illustrates an example of an embedded metrics information list.

DESCRIPTION OF THE EMBODIMENTS

Figure 14:
FIG. 14 illustrates business form document data that is output by using different metrics information.

First, prior to a description of the present invention, a description will be given of the influence on an output of business form document data due to the difference in metrics information obtained from the OS. FIG. 14 illustrates an example of the output of the business form document data when different metrics information is used even for the same font. An output image 1301 is a part of a business form image that has been output by using the metrics information before the update of the OS, and an output image 1303 is a part of the business form image that has been output by using the metrics information after the update of the OS.

In the output image 1301 before the update, a vertical writing character string 1302 is contained in the ruled line. A user specifies the size of the ruled line by using a form editing application. The user operates the size of the ruled line so as to contain the vertical writing character string 1302 in the form editing application, and as a result of editing the form, the output image 1301 is obtained.

However, if fonts are updated in accordance with the update of the OS and the metrics information that represents the maximum width of the characters becomes large, the vertical writing character string position of the second line moves to left. As a result, as in the output image 1303, a vertical writing character string 1304 is no longer contained in the ruled line. Thus, even if the same form information, that is, the same font is used, the result for output may be false due to the update of the OS.

Figure 16:
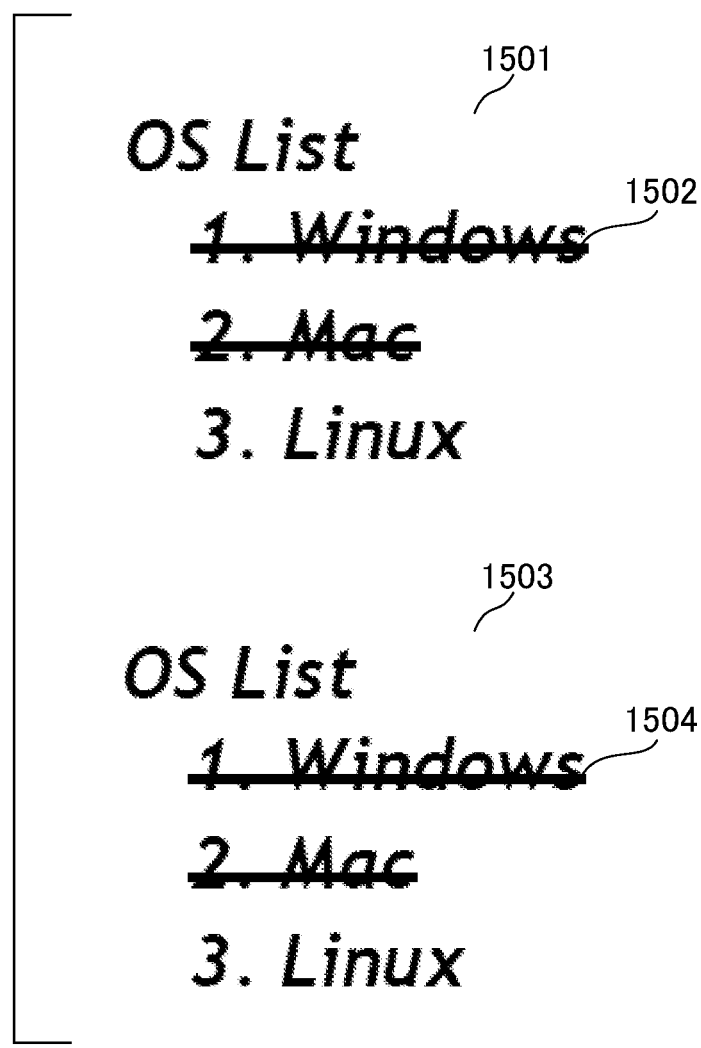
FIG. 16 illustrates business form document data that is output by using the different metrics information.

FIG. 16 is a diagram illustrating another example of the output of the business form document data when different metrics information is used even for the same font. In the case of the business form shown in FIG. 16, in comparison to a strike-through line position 1502 of the character string of an output image 1501 before the update of the OS, a strike-through line position 1504 of the character string of an output image 1503 after the update of the OS moves downward. Accordingly, in the present embodiments, even if the metrics information of the font is changed in accordance with the update of the OS or the like, it is possible to produce a business form page that maintains a layout when the form information was made. Hereinafter, a description will be given of embodiments for implementing the present invention with reference to attached drawings and the like.
(First Embodiment)

Figure 1:
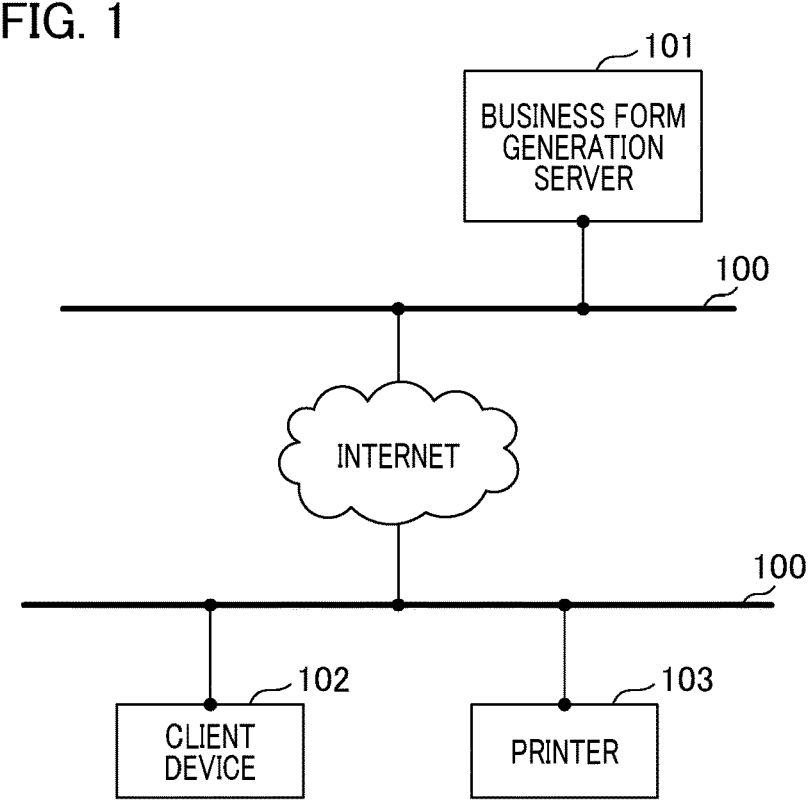
FIG. 1 illustrates an example of a configuration of an information processing system according to an embodiment of the present invention.

FIG. 1 is a diagram illustrating an example of a configuration of an information processing system according to the present embodiment. The information processing system shown in FIG. 1 includes a business form generation server 101 and a client device 102. The business form generation server 101 is the information processing apparatus of the present embodiment. The business form generation server 101 executes the overlay output processing. That is, the business form generation server 101 superimposes a field data file that is text data and a form information file including predetermined form information, and generates a business form page. Subsequently, the business form generation server 101 provides an instruction to a virtual printer in response to a request from the client device 102, and generates print data corresponding to the business form page, which serves as an electronic file.

The client device 102 performs a request for overlay output processing to the business form generation server 101, and a printing request to a printer 103. Additionally, the user performs the production of a form information file by a screen operation in the client device 102. The printer 103 performs a process that prints the business form document data on paper in response to a request from the client device 102.

Each component of the business form generation server 101, the client device 102, and the printer 103 is communicably connected via networks 100. The network is, for example, the Internet, a LAN, a WAN, a telephone line, a dedicated digital line, an ATM and a frame relay line, a cable TV line, or a data broadcasting wireless line. Note that the networks 100 are not limited thereto, and they may be the ones that can transmit and receive data, or they may be the ones that are realized by those combinations. Additionally, the networks 100 between each component maybe different from each other.

Figure 2:
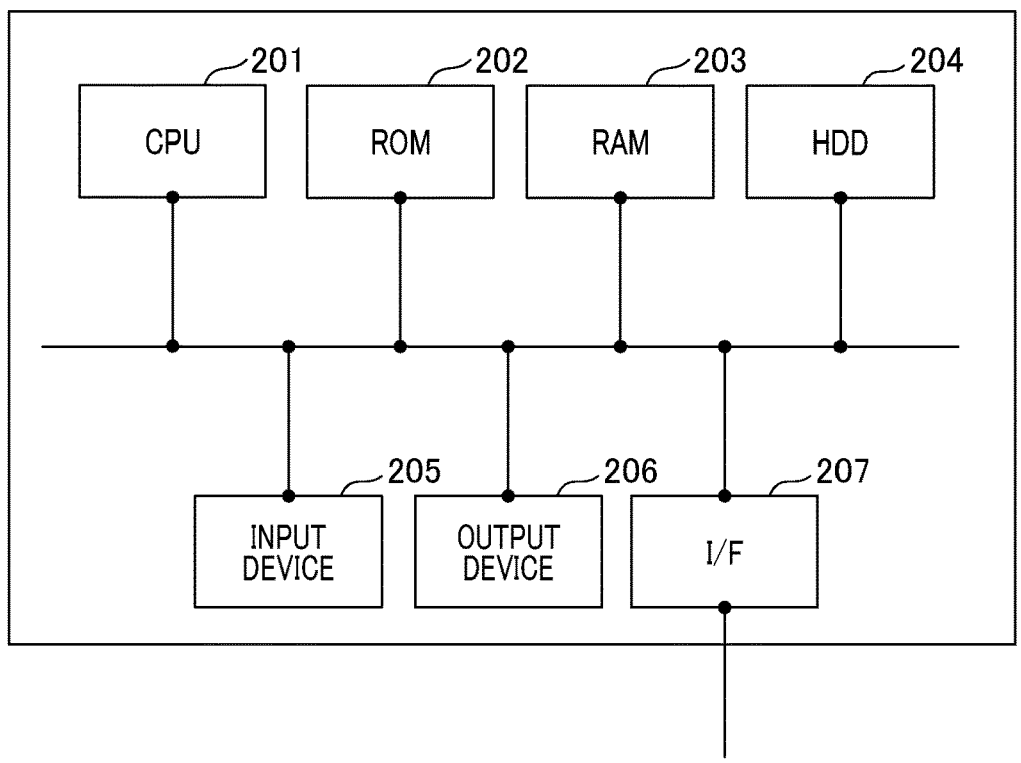
FIG. 2 illustrates a hardware configuration of an information processing apparatus according to an embodiment.

FIG. 2 is a diagram illustrating a hardware configuration of an information processing apparatus that realizes the business form generation server and the client device of FIG. 1. The apparatus shown in FIG. 2 includes a CPU (Central Processing Unit) 201 to an I/F 207. The CPU 201 executes a program for directly or indirectly controlling each device (for example, a ROM, a RAM described below) connected by an internal bus and realizing the present invention.

The BIOS (Basic Input Output System) is stored in the ROM (Read Only Memory) 202. The RAM (Random Access Memory) 203 is used as a work area of the CPU 201 and is used as a temporary storage for loading a software module for realizing the present invention.

In a HDD (Hard Disk Drive) 204, the OS (operating system), which is the basic software, and a software module are stored. It may be possible to provide an SSD (Solid State Drive) instead of the HDD 204. An input device 205 inputs information corresponding to an operation input by the user. The input device 205 is, for example, a keyboard, a pointing device (not illustrated). An output device 206 outputs information. A display is connected to the output device 206. The I/F 207 is an interface for connecting to the network 100.

After a startup of the device, the BIOS is executed by the CPU 201, and the OS is executably loaded from the HDD 204 into the RAM 203. The CPU 201 executably loads various software modules from the HDD 204 to the RAM 203 at any time in accordance with the operation of the OS. The various software modules are executed by the CPU 201 and performed. Additionally, the I/F 207 is controlled by the CPU 201 in accordance with the operation of the OS, and consequently realizes a communication with an external device.

Figure 3:
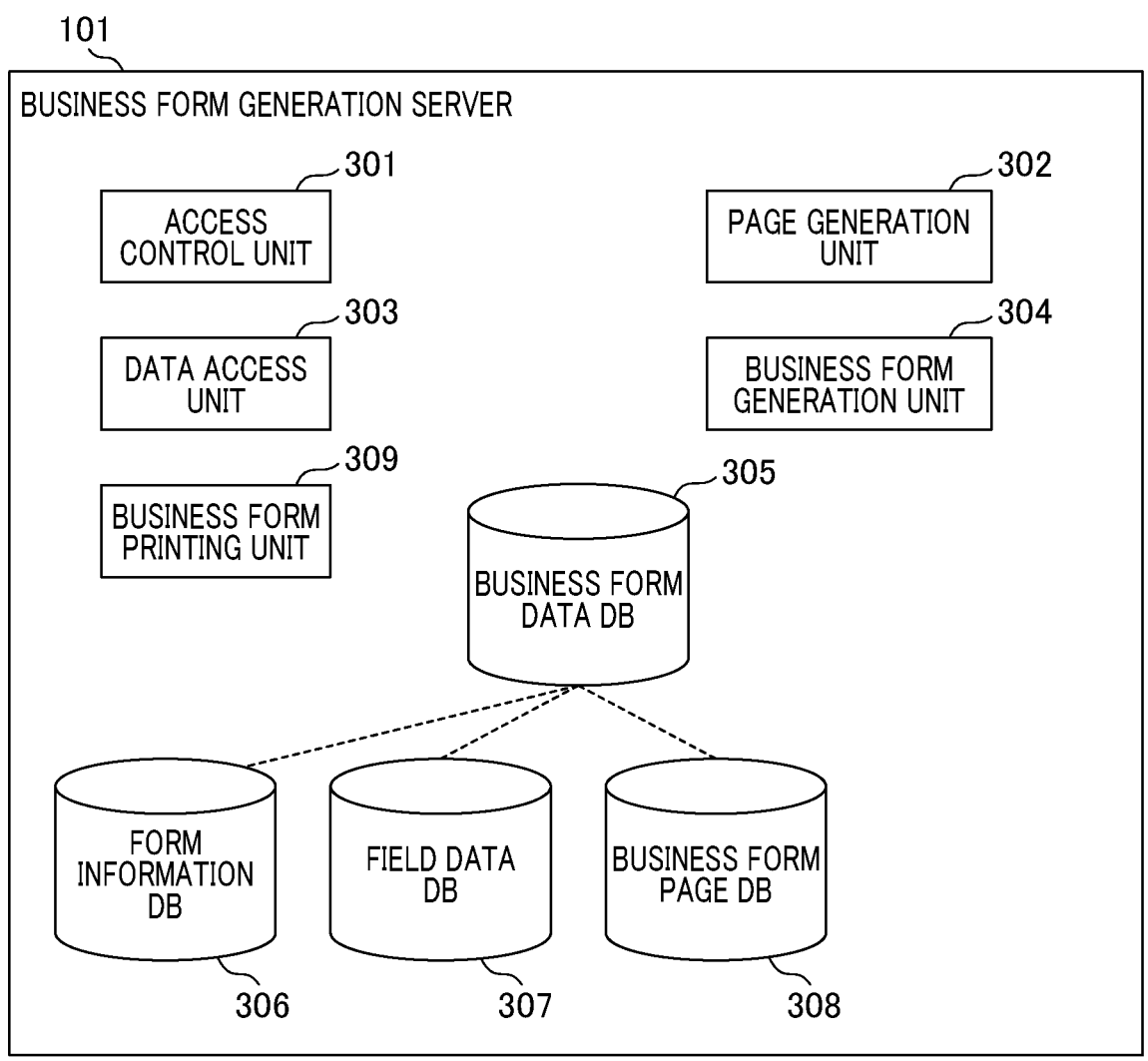
FIG. 3 illustrates an example of a configuration of a software module that operates on a business form generation server.

FIG. 3 is a diagram illustrating an example of a configuration of a software module that is performed on the business form generation server. Each software module is stored in the HDD 204 shown in FIG. 2, and is loaded into the RAM 203 by the CPU 201 and executed. The business form generation server 101 includes an access control unit 301 to a business form printing unit 309. The access control unit 301 performs user authentication in response to a request from the client device 102.

A page generation unit 302 generates a Web page for returning a response to the client device 102. A data access unit 303 performs access processing on each of databases (DB, memory unit) 305 to 308. A business form generation unit 304 reads out the form information file from a form information DB 306 via the data access unit 303. Additionally, the business form generation unit 304 reads out the field data file from a field data DB 307 via the data access unit 303.

Subsequently, the business form generation unit 304 superimposes form information 401, which is represented by the form information file that has been read, and the field data, which is represented by the field data file, and generates a business form page. Additionally, the business form generation unit 304 uses software, such as a virtual printer, and generates an electronic file of the business form page. The business form data is stored in the business form data DB 305.

The business form data shows information including a business form name and an owner, and has information that represents from which form information file and from which field data file the business form has been generated. Additionally, the business form data has information showing a business form page that is an overlay result of the business form. The form information file is stored in the form information DB 306. The field data file is stored in the field data DB 307. The business form page file that has been generated by the business form generation unit 304 is stored in a business form page DB 308. The business form printing unit 309 converts the business form page into a printable format in response to a request from the client device 102.

Figure 6:
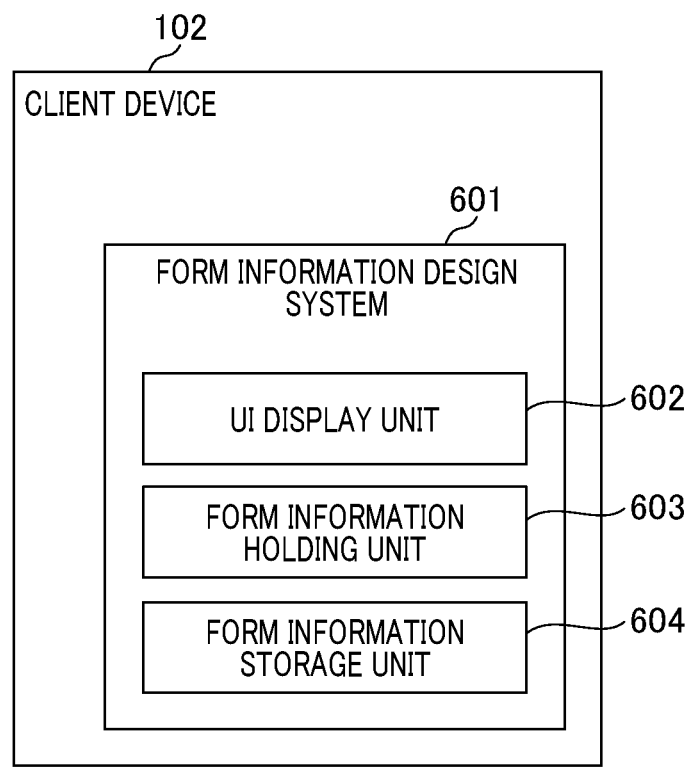
FIG. 6 illustrates an example of a configuration of a software module of a client device.

FIG. 6 is a diagram illustrating an example of a configuration of a software module that operates on a client device. Each software module is stored in the HDD 204 shown in FIG. 2, and it is loaded into the RAM 203 by the CPU 201 and executed. A form information design system 601 produces a form information file.

A user operates a screen so as to arrange objects such as a ruled line, a text, a logo, and an image in the form information file by using the form information design system 601, sets the attributes of those objects, and then produces a form information file. The form information design system 601 includes a UI display unit 602 to a form information storage unit 604. The UI display unit 602 displays a user interface for producing a form information file by the user. An example of a specific interface will be described below with reference to FIG. 4.

A form information holding unit 603 holds the form information including graphics arranged by the user and their attributes in the RAM 203. Additionally, the form information storage unit 603 detects a change of the form information by an operation of the user interface, and reflects it to the form information that is being held. The form information storage unit 604 stores the form information that is held in the RAM 203 by the form information holding unit 603 in the HDD 204 to serve as a form information file.

Figure 4:
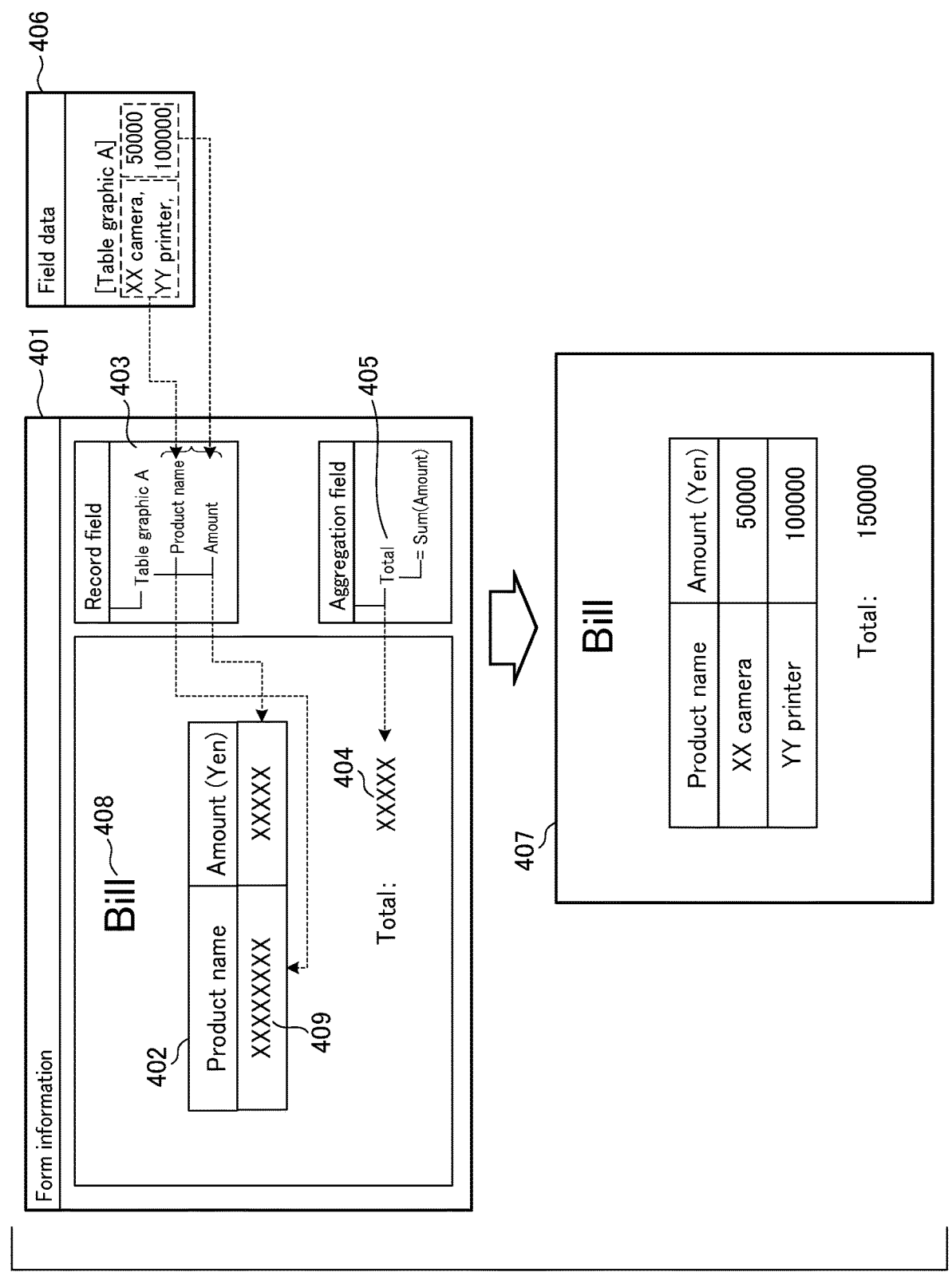
FIG. 4 is a diagram that explains overlay output processing by the business form generation server.

FIG. 4 is a diagram illustrating the overlay output processing by the business form generation server 101. The overlay output is to perform printing by superimposing form information that records information such as a border line of the manuscript paper format and text format data (field data). The result for the overlay output can be output as an electronic file, not on paper.

The form information is produced by using the form information design system 601 that has been installed in the client device 102. The form information is configured by a fixed graphic (form graphic 408) that does not depend on the field data, and a graphic (field graphic 409) that displays the received field data in accordance with the output format that has been specified. In order to produce the field graphic, it is necessary to produce an item (field) for receiving the field data in advance. The field is produced from an exclusive screen displayed by the form information design system 601.

When the field graphic is produced, associating the field that is a producing source is internally performed. In a tabular field graphic (Table graphic) 402, receiving the field data in record units is needed, and thus, a record field 403 is produced. A type of the field that generates the field data based on the calculation result of the data of another field graphic is defined as a calculated column field.

Additionally, a type of the field that generates field data by aggregation with a specified aggregation method is defined as an aggregation field. For example, in a field graphic 404, an aggregation field 405 is produced that represents which field and what aggregation method are specified. The business form generation server 101 reads the form information file in which the field graphic is defined, and the corresponding field data file 406. Subsequently, the business form generation server 101 superimposes the form information file and the field data file that have been read, and executes the overlay output processing. Reference numeral 407 of FIG. 4 shows an example of an overlay output processing result.

Figure 5:
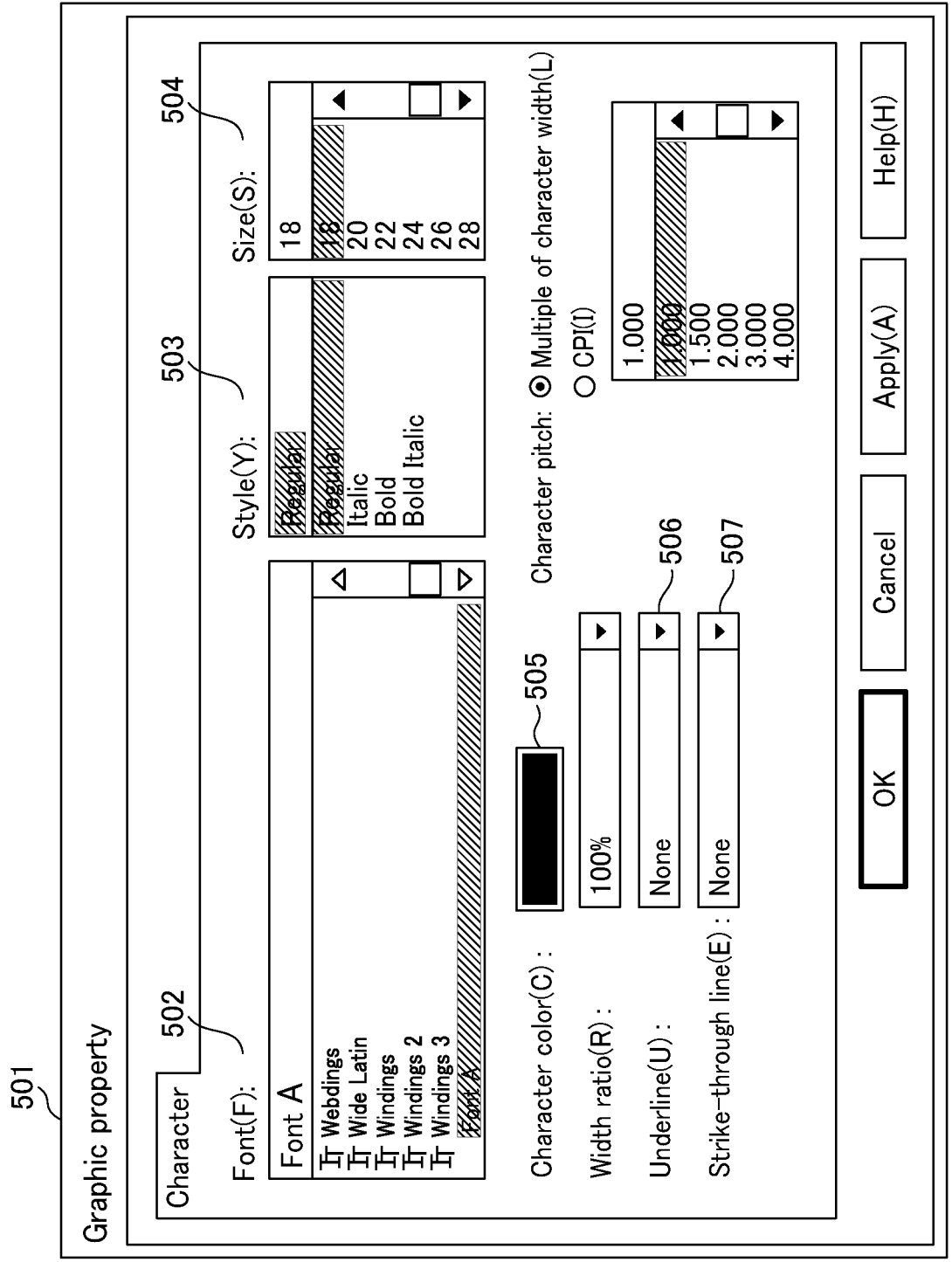
FIG. 5 illustrates an example of a character setting dialog.

FIG. 5 is a diagram illustrating an example of a user interface that performs setting related to a display character string of the form graphic and field graphic. In FIG. 5, a character setting dialog 501 is shown as an example of a user interface. The character settings dialog 501 is displayed by an UI display unit 602 of the form information design system 601. In a font name specification 502, the font name of the character string to be displayed in each graphic is selected. When producing a business form page, a font that matches the font name specified by the font name specification 502 is selected by the OS, and the character string is drawn.

In a font style specification 503, a font style to be used is selected. In a font size specification 504, a font size to be used is selected. In a character color specification 505, a character string color to be displayed in each graphic is selected. In an underline specification 506, whether or not to draw an underline under the character string, and the type of the underline is selected. For example, "solid", "dotted line", "dashed line", "two-dot chain line" can be selected as a type of underline. In a strike-through line specification 507, whether or not to draw the strike-through line on the character string, and a type of the strike-through line is selected. For example, "solid", "dotted line", "dashed line", "two-dot chain line" can be selected as a type of the strike-through line.

Figure 7:
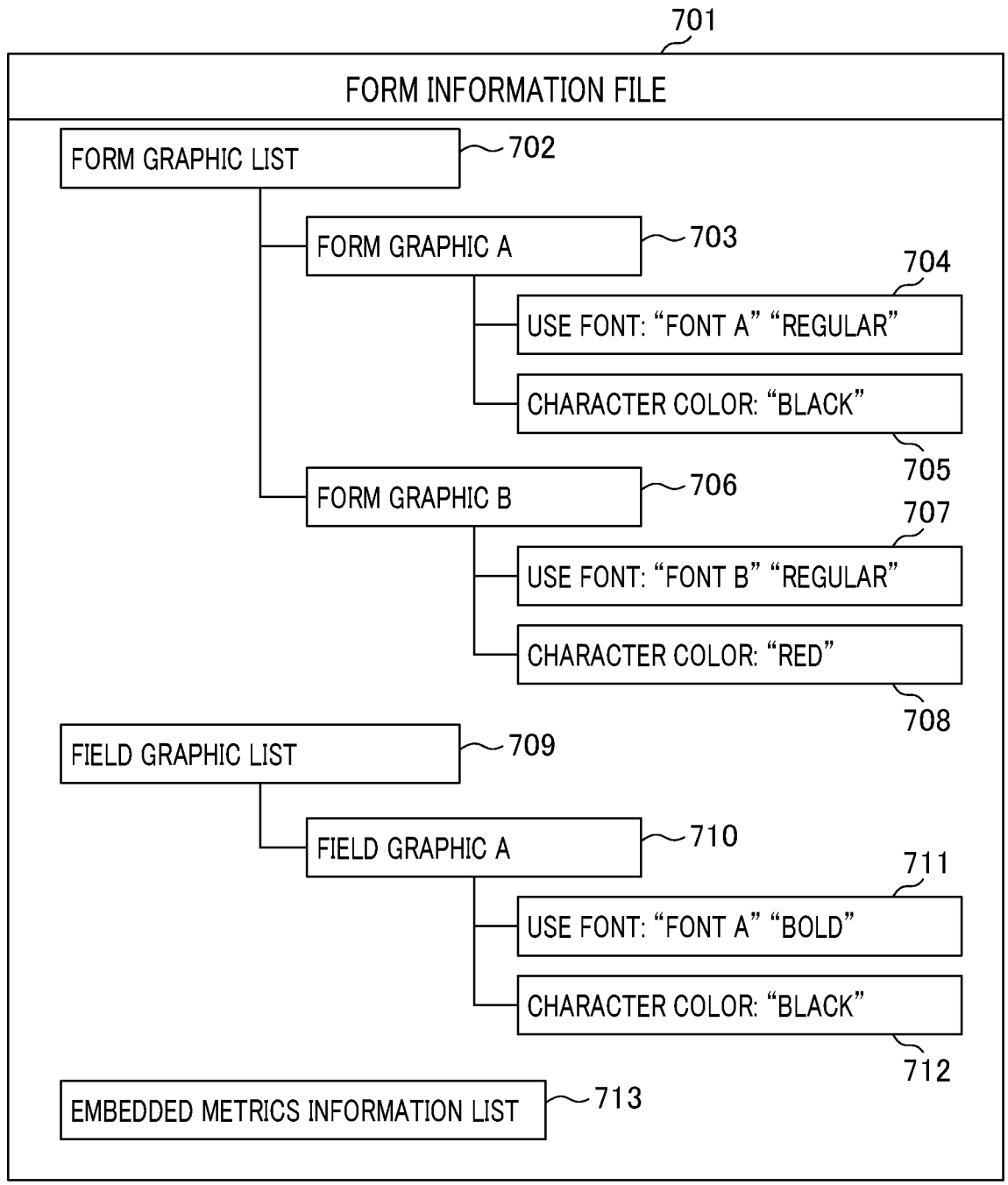
FIG. 7 illustrates the internal configuration of a form information file.

FIG. 7 illustrates an internal configuration of the form information file that is stored by the form information storage unit 604 included in the form information design system 601. A form information file 701 is configured by a form graphic list 702, a field graphic list 709, and an embedded metrics information list 713. The form graphic list 702 is a list of all form graphics defined in the form information file.

In the example shown in FIG. 7, a form graphic A 703 and a form graphic B 706 are defined. The form graphic A 703 and the form graphic B 706 hold the attributes of each form graphic. Use font information 704 and 707 hold information related to the font to be used when drawing the character string of each form graphic. For example, a use font for the form graphic A703 is a "font A", and the font style is "regular". Character color information 705 and 708 hold a drawing color of the character string of each form graphic. For example, the character color of the form graphic B706 is "red".

The field graphic list 709 is a list of all field graphics defined in the form information file. In the example shown in FIG. 7, a field graphic A 710 is defined. The field graphic A 710 holds the attributes of the field graphic. In a manner similar to the case of the form graphic, it has the elements such as use font information 711 and character color information 712. The embedded metrics information list 713 is a list of metrics information about the font that is specified in the form graphic and field graphic defined in the form information file.

FIG. 9 and FIG. 10 are diagrams illustrating an example of the embedded metrics information list. The embedded metrics information list 713 is stored in the form information file by the process of the flowchart of FIG. 11, which will be described below. In the embedded metrics information list 713, metrics information for each font that is specified in the form graphic and the field graphic that have been defined in the form information file is classified for each font name and font style and stored.

In the example shown in FIG. 9 and FIG. 10, the metrics information of a font having a font name "font A" 901 and a font having a font name "font B" 909 are defined. Additionally, as shown in the drawing, the "font A" 901 stores metrics information for each font style (902, 906, 907, and 908). Each set of metrics information is configured so as to allow a distinction between attributes and attribute values, for example, reference numeral 903.

In the example shown in FIG. 9, the embedded metrics information list 713 is represented in the XML (Extensible Markup Language) format. As in the reference numeral 903, the tag name of XML represents the attribute name, and the value of the element in the tag represents the attribute value. Note that in the present embodiment, although the embedded metrics information list 713 is represented in the XML format, any format that can distinguish attributes and the attribute values may be used, for example, a binary format that is inherent in the form information design system 601 may be used.

Additionally, as a type of metrics information, all of those that are used in the calculation processing of a layout configuration that is performed when the character string of the form graphic and field graphic defined in the form information file is drawn are stored. For example, there are an attribute, "tmMaxCharWidth" (maximum character width attribute 904) that indicates the maximum character width of all glyphs that are defined in the font, and an attribute, "otmsStrikeoutPosition" (strikethrough line position attribute 905) that indicates a position of the strikethrough line, and the like.

Figure 11:
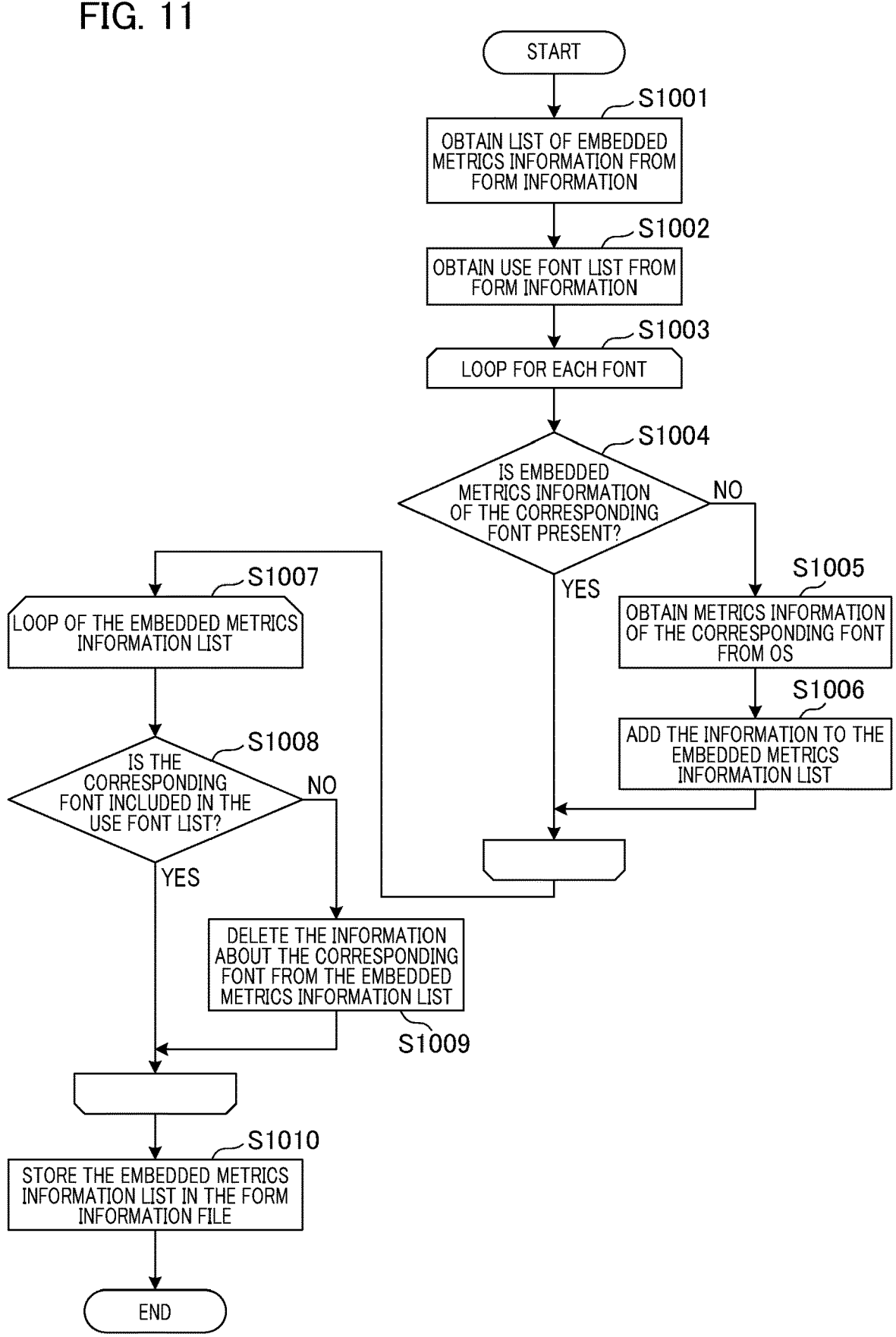
FIG. 11 is a flowchart representing a part of the storing processing of the form information file.

FIG. 11 is a flowchart illustrating a part of a storing process of the form information file executed by the form information storage unit 604 included in the form information design system. This process is executed when the user provides an instruction to store the form information file by using the user interface displayed by the UI display unit 602 included in the form information design system 601. Here, a situation is assumed in which the arrangement and attributes setting of each form graphic and field graphic have already been performed by the user's screen operation and their form information is held in the RAM 203 by the form information holding unit 603.

In step S1001, the form information storage unit 604 obtains the embedded metrics information list from the form information held in the RAM 203. When the form information file is newly produced, the embedded metrics information list is not included in the form information, the result for obtaining in that case is empty. In step S1002, the form information storage unit 604 obtains a list of font that is used in the form graphic and field graphic (use font list) from the form information that has been obtained.

Here, the form information held in the RAM 203 is held by a configuration similar to the form information file 701 shown in FIG. 7. The form information storage unit 604 confirms the configuration elements of all form graphics and field graphics included in the form graphic list 702 and the field graphics list 709, and lists the fonts that are specified there in the list. In that case, it is considered that the fonts that are same in the font name and the font style are specified as the same font, so as not to hold the fonts having the same font name and same font style in duplicate.

If one font that is different in the font style from the other font in spite of having the same font name, the font is listed in the list as a different font. Additionally, the font size is not relevant to the processing in step S1002. The form information storage unit 604 holds the use font list obtained in step S1002 in the RAM 203. In step S1003, the form information storage unit 604 extracts fonts one by one from the use font list that was obtained in step S1002 and performs the processes of the subsequent steps S1004 to S1006 for each font that has been extracted.

In step S1004, the form information storage unit 604 determines whether or not a font that matches the font name and font style of the use font extracted in step S1003 is present in the embedded metrics information list 713. In the embedded metrics information list 713, the metrics information is held for each font name and font style. The form information storage unit 604 searches for a tag that represents the font name and font style, and determines whether or not the font that matches them is present.

In step S1004, if the font that matches them is determined to be present in the embedded metrics information list 713, the process proceeds to step S1007. In contrast, in step S1004, if the font that matches them is determined not to be present in the embedded metrics information list 713, the process proceeds to step S1005. In step S1005, the form information storage unit 604 obtains the metrics information of the use font extracted from the OS on the client device 102 in step S1003.

In order to obtain the metrics information of the font from the TrueType font installed in Windows (registered trademark), API (Application Programming Interface) provided by Windows (registered trademark) is used. By specifying the font name to the API, the values such as a maximum character width attribute 904 and the strike-through line position attribute 905 of each font can be obtained.

In step S1006, the form information storage unit 604 shapes the font name and font style of the use font extracted in step S1003 and the metrics information obtained in step S1005 in the form of the embedded metrics information list 713. Subsequently, the shaped information is added to the embedded metrics information list 713 held in the RAM 203. In step S1007, the form information storage unit 604 performs the processes of the subsequent step S1008 and step S1009 for each font that is included in the embedded metrics information list 713.

In step S1008, the form information storage unit 604 determines whether or not the font included in the embedded metrics information list 713 is included in the use font list that has been obtained from the form information held in the RAM 203 in step S1002. The use font list held in step S1002 holds the font name and the font style separately. The font name and the font style of the font that are present in the embedded metrics information list 713 is compared to the font name and font style that are present in the use font list, and if the font that matches the font name and font style is found, the font is determined to be included in the use font list.

In step S1008, if the font included in the embedded metrics information list 713 is determined to be present in the use font list, the process proceeds to step S1010. In contrast, in step S1008, if the font included in the embedded metrics information list 713 is determined not to be present in the use font list, the process proceeds to step S1009. In step S1009, the form information storage unit 604 deletes the information about the font determined in step S1008 from the embedded metrics information list 713.

Accordingly, the metrics information of the font that is not used in the form information is deleted. The form information (form information file) is assumed to be repeatedly edited. If the increase of decrease of the form graphic and field graphic occurs due to re-editing, the increase or decrease of the font being used may occur, unrequired metrics information is deleted from the form information file by performing the process of step S1009.

In step S1010, the form information storage unit 604 adds the embedded metrics information list 713 that is held in the RAM 203 and has been changed in step S1006 and step S1009 to the form information file, and stores this in the form information DB 306. By the above process, the metrics information for all of the fonts used in the form graphic and the field graphic defined in the form information file is stored in the form information file, which serves as the embedded metrics information list 713.

Figure 8:
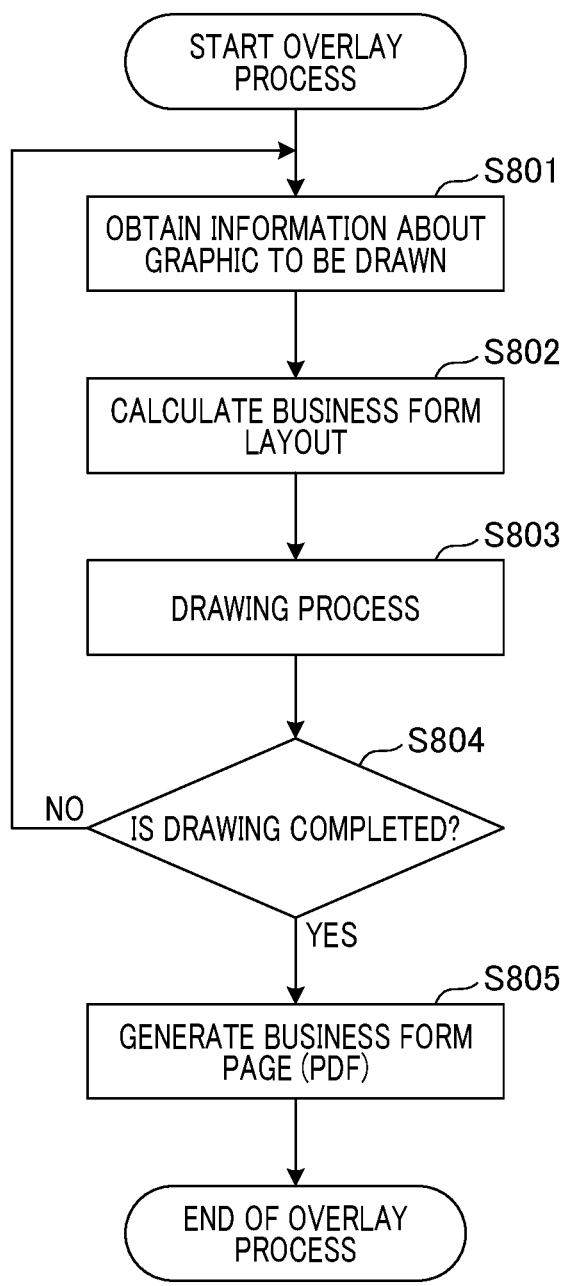
FIG. 8 is a flowchart that explains the overlay output processing.

FIG. 8 is a flowchart that explains an overlay output processing executed by a business form generation server. In step S801, the business form generation unit 304 obtains the information about the graphic to be drawn (the form graphic not associated with the field data and the field graphic associated with the field data) from the form information file stored in the HDD 204.

The information to be obtained is, for example, a font name, a font style, a font size of each graphic specified in the character setting dialog 501 by the user. Information necessary for calculation and drawing of the layout configuration is all stored in the form information file, and the necessary information is all obtained by the processing of step S801. In step S802, the business form generation unit 304 calculates the layout configuration of a business form page to be output by using the form information file and field data file. Details of the process that calculates the layout configuration will be described with reference to FIG. 12.

In step S803, the business form generation unit 304 performs drawing processing for each graphic in accordance with the layout configuration that was obtained in step S802. In step S804, the business form generation unit 304 determines whether or not the drawing commands for all graphics have been completed. In step S804, if all of the drawing commands are determined not to have been completed, the process returns to step S801, and the business form generation unit 304 performs the next drawing command.

In contrast, in step S804, if the drawing commands for all graphics are determined to have been completed, the business form generation unit 304 performs the process of step S805. In step S805, the business form generation unit 304 uses the PDL information that is the result for drawing processing (a page description language for providing instructions for the drawing to the printer), and generates a form page of a PDF format via the virtual printer.

Figure 12:
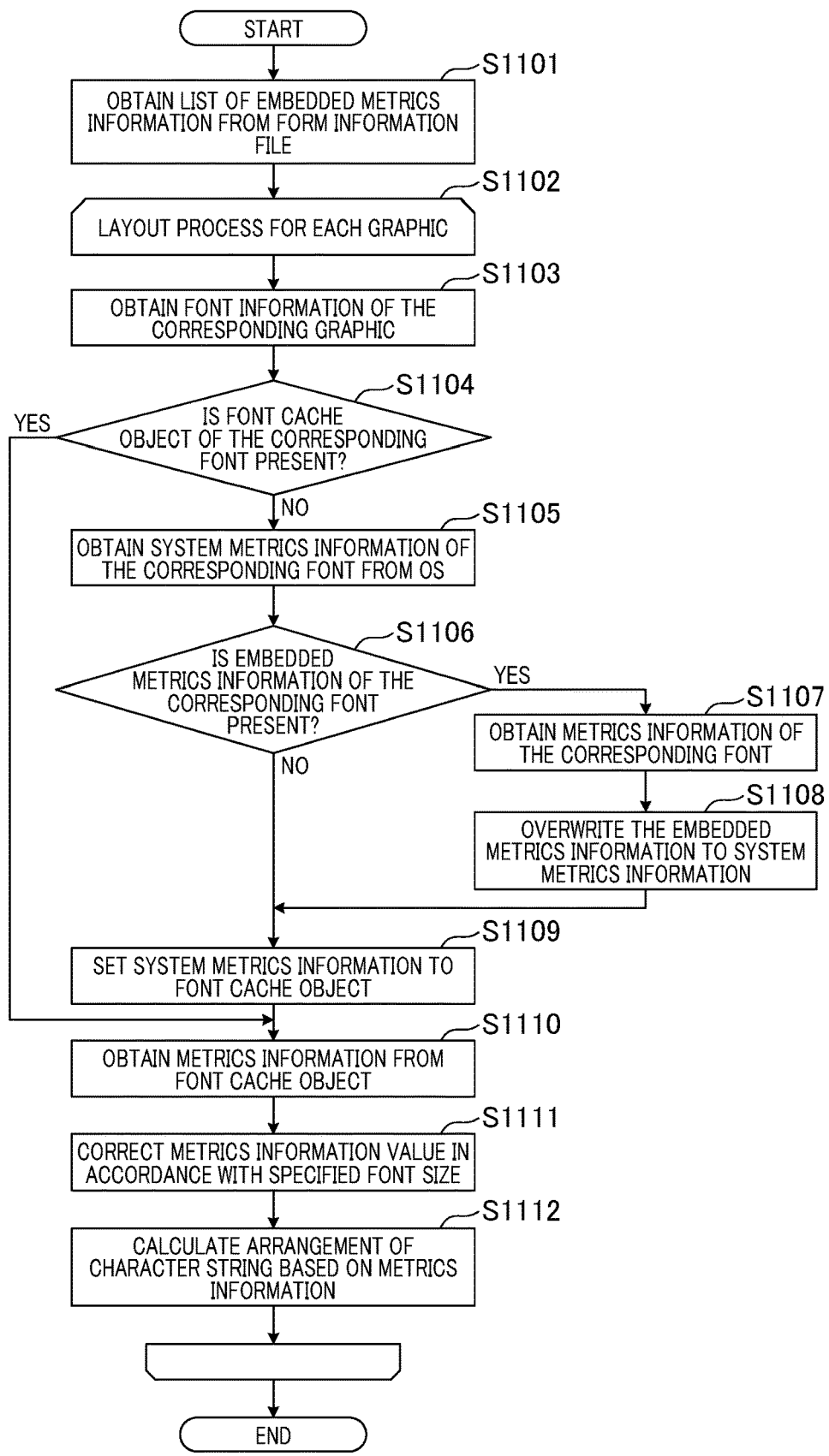
FIG. 12 is a flowchart that explains the layout processing of a business form page.

FIG. 12 is a flowchart that explains the layout process of the business form page executed by the business form generation unit included in the business form generation server. In step S1101, the business form generation unit 304 obtains the embedded metrics information list 713 from the form information file 701. The embedded metrics information list 713 that has been obtained is held in the RAM 203.

Next, the business form generation unit 304 performs the layout process for each form graphic and field graphic defined in the form information file by the process from step S1102 to step S1112. In step S1103, the business form generation unit 304 obtains font information about the graphic to be processed. Specifically, if the graphic to be processed is a form graphic, the graphic to be processed is retrieved from the form graphic list 702 of the form information file 701, and the font name and the font style are obtained from the use font information of the graphic that has been hit (704 or 707).

Additionally, if the graphic to be processed is a field graphic, the graphic to be processed is retrieved from the field graphic list 709 of the form information file 701, and the font name and the font style are obtained from the use font information 711 of the graphic that has been hit. Instep S1104, the business form generation unit 304 determines whether or not a font cache object of a font that matches the font name and the font style obtained in step S1103 is present in the RAM 203.

The font cache object is used for the processing efficiency for the following reasons. Specifically, as shown in FIG. 7, the form information file stores the font name and font style for each graphic, and, in one form information file, the same font name and font style may be specified. For this reason, there maybe cases in which the same font name and same font style are specified for a plurality of graphics.

Because the fonts having the same font name and same font style have the same metrics information as each other, repeatedly performing the obtaining process of the metrics information (system metrics information) from the OS, which will be described below, on the same font and same font style is wasteful. In order to avoid this, the metrics information of the font held in the RAM 203 in step S1109 described below is held by using the font cache object. Note that, due to the use of font cache object for efficiency of the process, the font cache object is not required in the present embodiment.

Instep S1104, if the font cache object of the font that matches the font name and the font style is determined to be present, the process proceeds to S1110. In contrast, instep S1104, if the font cache object of the font that matches the font name and the font style is determined not to be present, the process proceeds to step S1105. In step S1105, the business form generation unit 304 obtains the metrics information (system metrics information) of the use font that was obtained from the OS on the business form generation server 101 in step S1103. The specific method for obtaining this information is similar to that in the process in steps S1005.

In step S1106, the business form generation unit 304 determines whether or not the font that matches the font name and the font style obtained in step S1103 is present in the embedded metrics information list 713 obtained in step S1101. The specific determination method is similar to that in the process of step S1004.

In step S1106, if the font that matches the font name and the font style is determined to be present in the embedded metrics information list 713, the process proceeds to step S1107. In step S1106, if the font that matches the font name and the font style is determined not to be present in the embedded metrics information list 713, the process proceeds to step S1109. In step S1107, the business form generation unit 304 obtains the metrics information of the font that matches the font name and the font style from the embedded metrics information list 713.

For example, the metrics information that is obtained in a case where the font having the font name "font A" and the font style "regular" is the use font of the graphic to be processed is as below. Specifically, the values of all of the metrics information including "tmHeight" (the height information 903 from the base line), the maximum character width attribute 904, and the strikethrough line position attribute 905 are obtained. In step S1108, the business form generation unit 304 overwrites the metrics information that was obtained from the embedded metrics information list 713 in step S1107 to the system metrics information that was obtained in step S1105.

In the metrics information of the embedded metrics information list 713, a part of attributes is defined from among the attributes included in the system metrics information. Accordingly, by the process in step S1108, a part of the attribute values of the system metrics information is overwritten by the attribute value of the embedded metrics information list 713. In step S1109, the business form generation unit 304 produces a font cache object and sets all of the attributes of the system metrics information to the object. The metrics information set in the font cache object is used for arrangement position calculation processing of a character string to be described below.

In step S1110, the business form generation unit 304 obtains all of the metrics information from the font cache object. In step S1111, the business form generation unit 304 corrects the value of each item of metrics information obtained in step S1110 so as to match the font size of the form graphic or field graphic specified to serve as attributes in the text setting dialog 501 by a user.

Specifically, the font size is stored in the form information file 701 serving as the setting information (not illustrated) of the form graphic (703 or 706) or the field graphic A710. In correction processing, the ratio calculation is performed between the font size (font height specification) and the "tmHeight" (height information 903 from the base line) of the metrics information.

For example, if the font size (font height specification) of the font having the font name "font A" and the font style "regular" is "10 pt", the value of the maximum character width attribute 904 is calculated as follows (where 1 pt is set to 0.35 mm):

$$3.5 \times 4525 = 3072$$

Additionally, the calculated value is mm units, and thus the business form generation unit 304 converts the value to a unit that can be specified in API for text-drawing provided by the OS. In step S1112, the business form generation unit 304 calculates the arrangement position of each character of the text to be drawn in the graphic to be processed by using the metrics information that has been corrected in step S1111.

Figure 13:
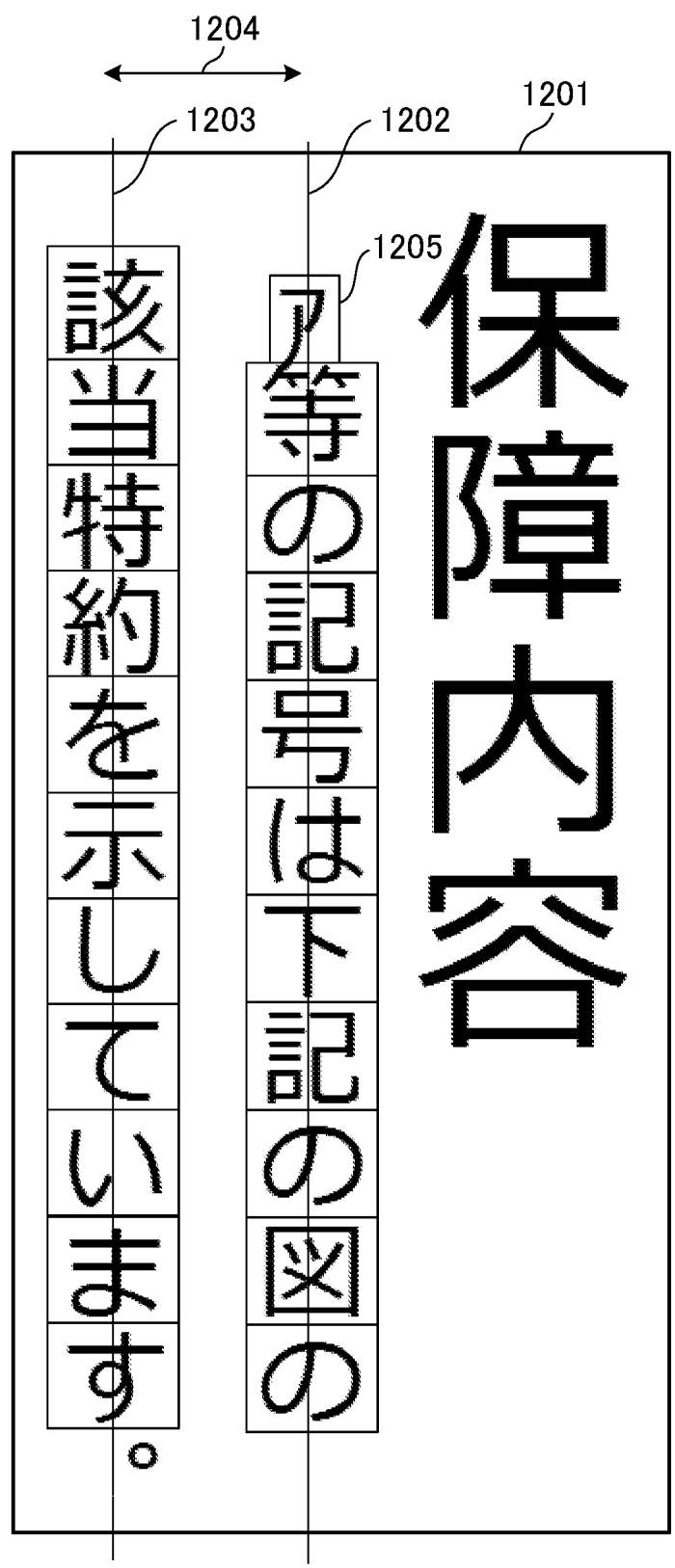
FIG. 13 illustrates a process that calculates the arrangement position of the character string.

FIG. 13 is a diagram illustrating a process that calculates the arrangement position of the character string. In FIG. 13, two lines of characters in vertical writing are arranged from the character 1205 (these two lines are drawn in one field graphic). The first character 1205 of the first line is relatively determined in response to the margins and alignment settings based on the information about the arrangement position of the field graphic included in the form information file. The glyph of each character that starts with the character 1205 is aligned with a center line 1202 and a center line 1203 of each line.

The business form generation unit 304 uses the metrics information that has been corrected in step S1111, and determines the arrangement position of the center line 1203 of the second line. In this case, the maximum character width attribute 904 used is from among the metrics information. For example, when X-coordinate of the centerline 1202 of the first line is 100, a value that is obtained by adding the attribute value of the maximum character width attribute 904 to the X coordinate is the X-coordinate of the center line 1203 of the second line.

As described above, the character position is calculated by using the metrics information stored in the form information file (in the present embodiment, the value of the maximum character width attribute 904), and consequently, it is possible to determine the character position equivalently without depending on the version of the font installed in the OS. That is, even if the metrics information of the font included in the OS is changed, it is possible to maintain the layout when the form of the business form is edited.

(Second Embodiment)

Figure 15:
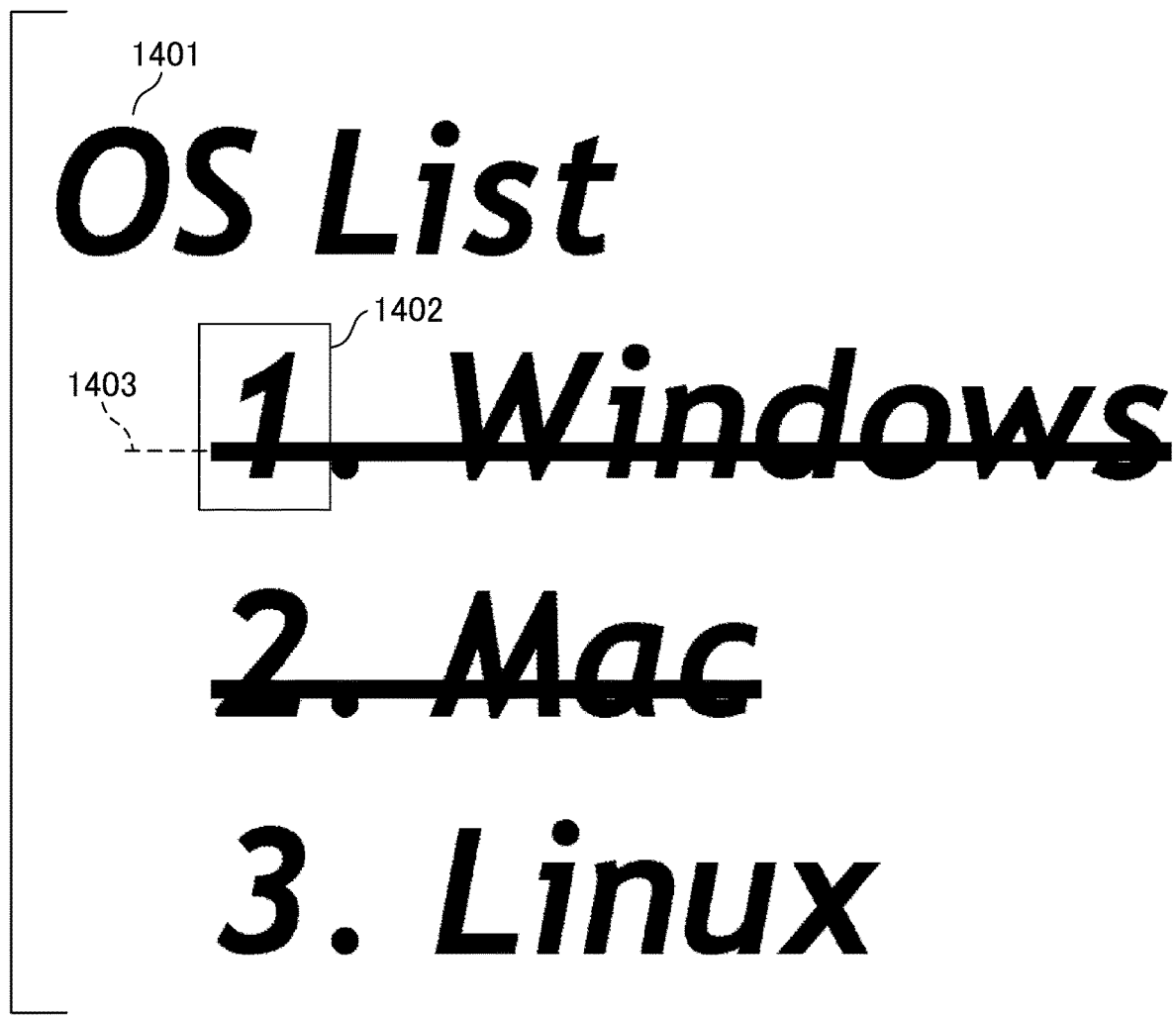
FIG. 15 illustrates an example of a part of the business form image of the European font business form.

In the present embodiment, an example that applies the present invention in the business form in which a strikethrough line is set on the character string will be described. FIG. 15 is a diagram illustrating an example of a part of the business form image. In the business form image 1401, a few lines of the character string in English have been drawn. Strike-through lines are drawn on the second and third lines. The position of the strike-through lines is included in the metrics information of the font. The position where the strike-through line needs to be drawn with respect to the glyph 1402 is shown by the "font position" of the metrics information. The business form generation unit 304 draws the strike-through line by using the position information of the strike-through line from among the metrics information stored in the form information file. Therefore, the strike-through line can be drawn on the same position even if the OS is updated.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-233156, filed Nov. 30, 2015, which is hereby incorporated by reference wherein in its entirety.

What is claimed is:

1. An information processing system comprising:
a memory that stores a program; and
a processor that executes the program to perform:
obtaining, from an operating system of the information processing system being used at the time when form information of a business form is edited, metrics information related to a font being used in the form information of the business form in a case where the form information of the business form is edited, wherein the metrics information indicates at least one of a maximum character width of glyphs defined in the font, a position where a strike-through line is drawn, and a position where an underline is drawn;
storing the obtained metrics information together with the edited form information into a storage unit, wherein, in a case where non-used metrics information related to a font that has not been used in the edited form information is stored in the storage unit, the processor deletes the non-used metrics information from among metrics information to be stored together with the edited form information in the storage unit;
calculating, in response to receiving a request for overlay output processing, a layout configuration of the business form by using the metrics information that has been stored together with the edited form information in the storage unit instead of second metrics information that can be obtained from the operating system of the information processing system being used at the time when the request is received; and
generating a business form page by performing overlay output of the form information and field data of the business form based on the calculated layout configuration.

2. The information processing system according to claim 1,
wherein, in the obtaining, the metrics information for each of a font name and a font style of the font being used in the form information of the business form is obtained from the operating system of the information processing system being used at the time when the form information of the business form is edited, and
wherein, in the storing, the metrics information for each of the font name and the font style are stored.

3. The information processing system according to claim 1, wherein the information processing system is a server apparatus, and wherein the server apparatus receives the request from a client apparatus.

4. The information processing system according to claim 1, wherein, in the calculating, the processor determines whether metrics information related to the font being used in the form information of the business form has already been cached,
wherein, in the calculating, the processor further determines whether the metrics information related to the font being used in the form information of the business form has been stored in the storage unit,
wherein, in a case where it is determined that the metrics information related to the font being used in the form information of the business form has not been cached yet and where it is determined that the metrics information related to the font being used in the form information of the business form has been stored in the storage unit, the processor caches the metrics information that has been stored in the storage unit,
wherein, in a case where it is determined that the metrics information related to the font being used in the form information of the business form has not been cached yet and where it is determined that the metrics information related to the font being used in the form information of the business form has not been stored in the storage unit, the processor caches the second metrics information that is obtained from the operating system being used at the time when the request is received, and
wherein the processor calculates the layout configuration of the business form by using the cached metrics information and the cached second metrics information.

5. A method for controlling an information processing system comprising:
obtaining metrics information related to a font being used in form information of a business form, from an operating system of the information processing system being used at the time when the form information of the business form is edited, wherein the metrics information indicates at least one of a maximum character width of glyphs defined in the font, a position where a strike-through line is drawn, and a position where an underline is drawn;
storing the obtained metrics information together with the edited form information in a storage,
wherein, in a case where non-used metrics information related to a font that has not been used in the edited form information is stored in the storage, the processor deletes the non-used metrics information from among metrics information to be stored together with the edited form information in the storage;
calculating, in response to receiving a request for overlay output processing, a layout configuration of the business form by using the metrics information that has been stored together with the edited form information in the storage instead of second metrics information that can be obtained from the operating system of the information processing system being used at the time when the request is received; and
generating a business form page by performing overlay output of the form information and field data of the business form based on the calculated layout configuration.

6. A non-transitory storage medium on which is stored a computer program for making a computer of an information processing apparatus to perform:
obtaining metrics information related to a font being used in form information of a business form from an operating system of the information processing apparatus being used at the time when the form information of the business form is edited, wherein the metrics information indicates at least one of a maximum character width of glyphs defined in the font, a position where a strike-through line is drawn, and a position where an underline is drawn;

storing the obtained metrics information together with the edited form information into a storage unit wherein, in a case where non-used metrics information related to a font that has not been used in the edited form information is stored in the storage unit, the computer deletes the non-used metrics information from among metrics information to be stored together with the edited form information in the storage unit;

calculating, in response to receiving a request for overlay output processing, a layout configuration of the business form by using and the metrics information that has been stored together with the edited form information into the storage unit instead of second metrics information that can be obtained from the operating system of the information processing system being used at the time when the request is received; and generating a business form page by performing overlay output of the form information and field data of the business form based on the calculated layout configuration.

* * * * *